(12) United States Patent
Brazier

(10) Patent No.: US 7,111,697 B2
(45) Date of Patent: Sep. 26, 2006

(54) CHASSIS SUPPORTED TRACK ASSEMBLY

(76) Inventor: Glen Brazier, 202 Cleveland Ave. E, Karlstad, MN (US) 56732-0239

( * ) Notice: Subject to any disclaimer, the term of this patent is extended or adjusted under 35 U.S.C. 154(b) by 0 days.

(21) Appl. No.: 11/199,904

(22) Filed: Aug. 9, 2005

(65) Prior Publication Data

US 2006/0108157 A1 May 25, 2006

Related U.S. Application Data

(63) Continuation of application No. 10/659,672, filed on Sep. 10, 2003, now Pat. No. 6,926,105.

(51) Int. Cl.
*B62D 55/00* (2006.01)
(52) U.S. Cl. ........................ 180/9.21; 180/9.1
(58) Field of Classification Search ............... 180/9.1, 180/9.21, 9.44, 9.46, 9.48, 9.5; 305/116, 305/135

See application file for complete search history.

(56) References Cited

U.S. PATENT DOCUMENTS 6,116,362 A * 9/2000 Schubert et al. ............ 180/9.44
6,176,334 B1 * 1/2001 Lorenzen ................... 180/9.48

* cited by examiner

*Primary Examiner*—Lesley D. Morris
*Assistant Examiner*—Lee Lum
(74) *Attorney, Agent, or Firm*—D L Tschida

(57) ABSTRACT

An endless track assembly wherein the weight of an associated vehicle/equipment is supported by the track framework. The track assembly provides a framework having a number of idler rollers and a drive sprocket that mounts to a rotational drive power source. The weight of the vehicle is transferred from a vehicle/equipment support flange that cooperates with a complementary support surface of the track framework and an intermediate bearing liner. The bearing support surfaces cooperate to permit the track frame to pivot relative to the chassis independent of the drive sprocket. The track assembly is particularly adapted to pivoting irrigation systems.

21 Claims, 5 Drawing Sheets

FIG. 5
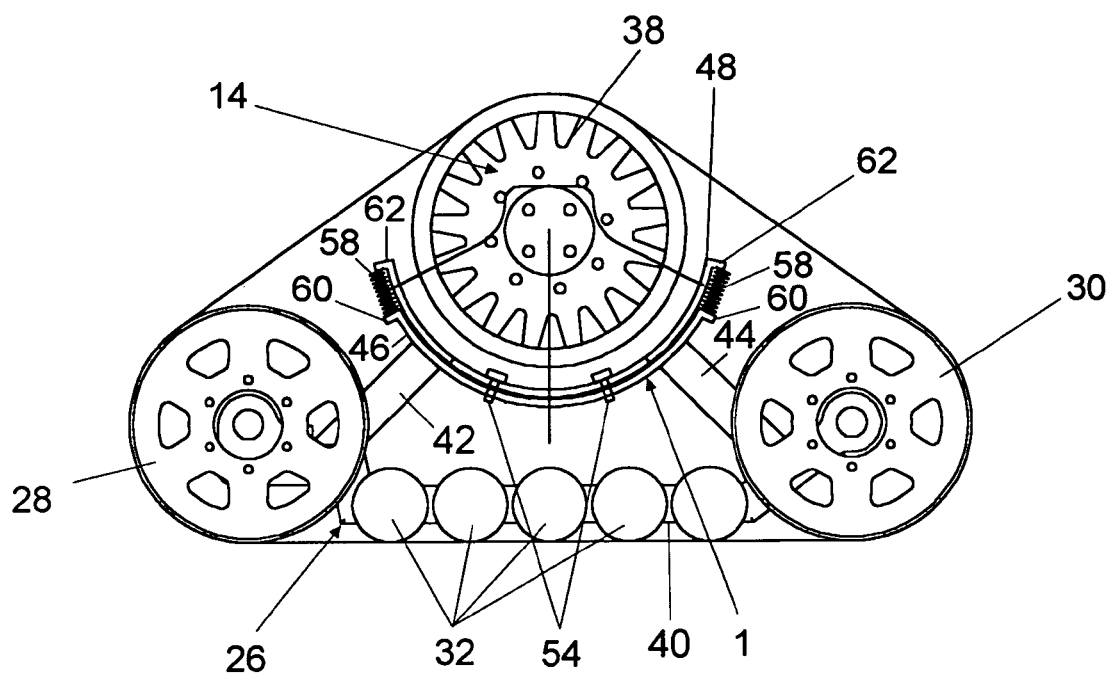
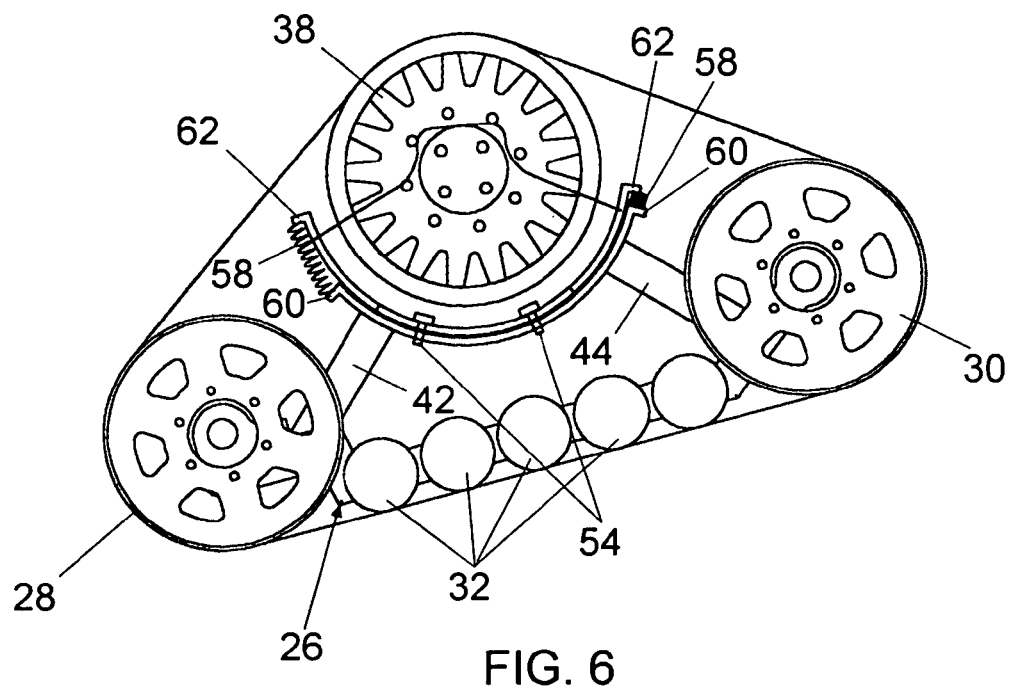
FIG. 6

CHASSIS SUPPORTED TRACK ASSEMBLY

CROSS-REFERENCE TO RELATED APPLICATIONS

This is a continuation of application Ser. No. 10/659,672, filed on Sep. 10, 2003, now U.S. Pat. No. 6,926,105.

BACKGROUND OF THE INVENTION

The present invention relates to a track assembly and, in particular, to an improved endless track assembly that rotationally couples to a vehicle drive power source and pivotally couples to a chassis support and whereby the chassis support accommodates heavy weight vehicles and ambulatory equipment.

Track systems have been developed for use over soft and unprepared natural terrain by a variety of vehicles and equipment in different recreational, commercial, farm and military applications. Such vehicles and equipment can include wheels and/or endless track assemblies to achieve traction over off-road surfaces with relatively low surface pressure at the contact surfaces of the drive train. For example, large capacity people haulers, trailers, manure spreaders, irrigation systems, and military vehicles include tracks. Many devices use tracks that extend a substantial length of the equipment and are supported by a single drive roller and/or numerous idler rollers. The vehicle/equipment weight is generally concentrated at the several axle-bearing surfaces that extend from the vehicle/equipment. That is, the vehicle weight is supported at the relatively small surface area of several drive train axles, while the loading relative to the ground is determined at the larger surface area of the track to ground interface.

The difficulty with such axle support assemblies is that the chassis/equipment weight is supported by one or more bearing supports having relatively small surface areas. The weight of many types of vehicles and equipment however can exceed the loading tolerances of the bearing surfaces, unless more expensive bearing supports are used. Alternatively, a large number of less costly bearing supports can be designed into any piece of equipment.

Desirably a mounting is required whereby a bearing support with a large surface area is mounted intermediate the chassis of the vehicle/equipment to off-load the primary weight from the bearings of the drive/idler axles. The present improved track assembly was developed to accommodate the foregoing need and provide a track assembly wherein the vehicle weight is supported at a chassis to track assembly bearing surface.

The improved track assembly provides a framework having a number of idler rollers that extend from and are displaced along a track frame to support an endless track. A separate drive sprocket/drum mounts to a rotational drive power source at the vehicle/equipment and controls track movement. The weight of the vehicle is supported by a flange that extends from the chassis and cooperates with a complementary surface of the track framework. An intermediate bearing liner mounts between the flange and track framework. The bearing support surface of the track framework allows the track frame to pivot relative to the chassis independent of the drive sprocket/drum and/or idler wheels.

SUMMARY OF THE INVENTION

It is a primary object of the invention to provide a large bearing support surface area for an endless track framework assembly independent of support surfaces provided at drive and/or idler axles.

It is further object of the invention to provide an endless track framework having a drive power sprocket/drum and several idler wheels that extend and rotate at the framework independent of a framework bearing support that mounts between the vehicle/equipment chassis and the track framework.

It is a further object of the invention to provide a track framework having a circular bearing support surface that interlocks with a circular chassis support surface and an intermediate bearing liner, such as constructed from a slippery, high-density material, roller, ball or other bearings.

It is a further object of the invention to provide a resilient, torsional bias between the mating bearing surfaces to resist motion in one or both directions of a reciprocating relative movement between the bearing supports.

It is a further object of the invention to provide mating bearing surfaces between the vehicle/equipment chassis and a track framework with a resilient, torsion bias and which bearing surfaces are concentrically aligned to a drive power axle to the track assembly.

The foregoing objects, advantages and distinctions of the invention are obtained in the presently preferred track assembly of the invention. The assembly provides a metal support framework having a circular bearing support surface. Several vertical risers and cross supports of the track framework brace the bearing support surface. Several sets of large and/or small diameter idler wheels are arrayed about the framework and mate with an endless drive track. A replaceable drive sprocket/drum is coupled to a rotary power source at the chassis/equipment and couples to rotate the drive track.

A bearing support flange extends from the vehicle/equipment chassis and aligns with the framework bearing support surface. A slippery, high density bearing material interfaces between the bearing support surfaces. The track framework is thereby supported to rotate relative to vehicle/equipment chassis independent of the rotary drive power source to the track assembly.

Resilient members are fitted to the bearing supports to provide a torsional control over reciprocating movement of the track assembly. Springs, expansible/compressible material, hydraulic/pneumatic cylinders, among other resilient mechanisms can be used to provide the desired torsion control. Stop limits are provided to limit the range of motion of the track assembly and/or relative movement of the bearing support surfaces.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

BRIEF DESCRIPTION OF THE DRAWINGS

FIG. 5 is a diagrammatic representation showing resilient biasing members supported in a neutral condition between end stops at the chassis and track framework bearing supports.

FIG. 6 is a diagrammatic representation showing the track assembly rotated against one of the stops with one torsion member compressed and the other extended to bias the support back to the neutral condition.

Figure 1:
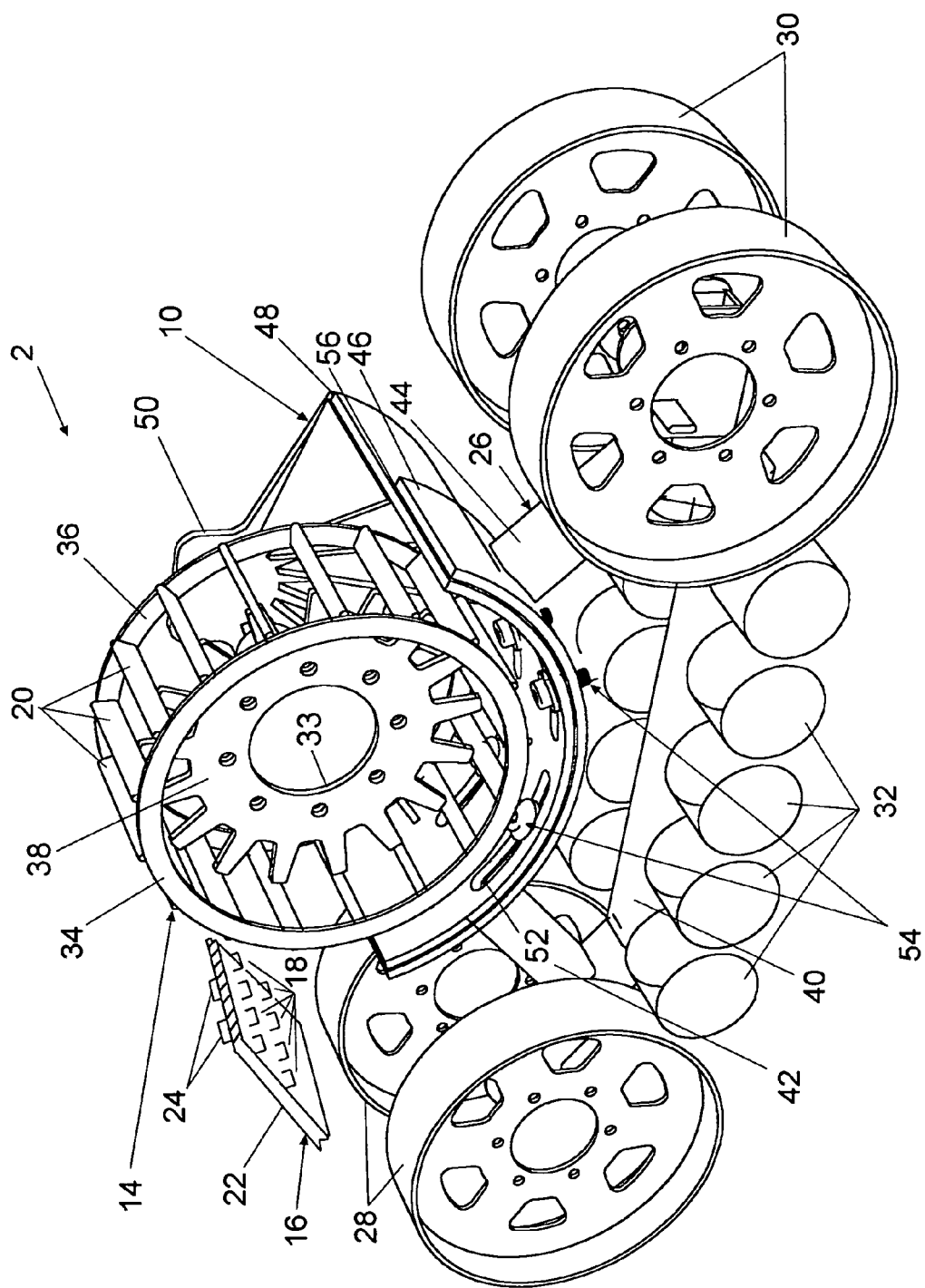
FIG. 1 is an assembled perspective drawing of a track assembly wherein the framework includes a chassis bearing support and wherein the track is shown in partial section.

Similar structure throughout the drawings is referred to with the same alphanumeric reference numerals and/or characters.

DESCRIPTION OF THE PREFERRED EMBODIMENT

Referring to FIGS. 1–4, several assembled and exploded assembly views are shown to improved track assemblies 2, 4 and 6 of the invention. The track assemblies 2, 4 and 6 find particular use with relatively heavy weight vehicles and equipment, such as large trucks, irrigation systems and the like. Each of the track assemblies 2, 4 and 6 includes a load bearing support assembly 10, 12 or 13 that displaces the weight of the associated vehicle/equipment over a large bearing surface area. The weight of the vehicle/equipment is thereby shifted off the drive power coupling and track drive sprocket 14 onto the chassis support assembly 10, 12 or 13. The load bearing support assemblies 10, 12 or 13 are concentrically arranged to the axis of the drive power linkage to allow the track assemblies 2, 4 and 6 to rotate and accommodate changes in the terrain.

Each of the track assemblies 2, 4 and 6 includes a reinforced, endless track 16, shown only at FIG. 1 but understood to be included with each of the assemblies 2, 4 and 6. The track 16 is typically constructed of rubber with suitable belting and reinforcing fibers to withstand typically encountered terrain, including rocks, logs, mud, sand etc. The interior surface of the track 16 provides several laterally displaced rows of lugs 18 that engage lateral teeth 20 of the sprocket 14. The ground-engaging surface 22 of the track 16 includes other lugs 24 that are shaped and arrayed to enhance traction and travel over an anticipated terrain.

The lateral edges of the track 16 are typically constructed to cup or flex slightly inward at the extreme peripheral edges, upon setting a preferred tension. The cupping in the space adjacent exposed sides of adjoining idler wheels 28–32 facilitates retention of the track 16 to the idler wheel suspension.

The track 16 is suspended around the drive sprocket 14 and a framework 26. Two large diameter, forward and aft idler wheels 28 and 30 and several smaller diameter interior idler wheels 32 support the track 16. The idler wheels 28–32 are supported from axles (not shown) that extend from and to the lateral sides of the track framework 26. The idler wheel axles project from the framework 26 as stationary stub axles. In a through-frame configuration, they can support a pair of the idler wheels 28, 30.

A track tensioner assembly of conventional screw-follower construction (not shown) can be provided to cooperate with the fore and/or aft idler wheels 28 and 30. Typically such assemblies incorporate a threaded member that cooperates with a track engaging piece to cause the track 16 to expand and contract in relation to the adjustment of the threaded member.

Alternatively, an eccentric coupling can be provided at the sprocket 14 or at the axles to the idler wheels 28 and 30. If such a coupling is provided between the framework 26 and the drive linkage to the vehicle/equipment, the sprocket 14 is mounted to rotate in a cam fashion relative to the track 16 to establish the tension. That is, a bearing housing having and eccentric outer surface is fitted over a drive axle to the sprocket 14 and is aligned to the rotational axis of the sprocket 14. A similar mounting of an eccentric housing in the bores of the sets of idler wheels 28, 30 relative to a through axle at either or both of the fore and aft idler wheels 28, 30 can cause the sets of idlers wheels 28, 30 to expand and contract relative to the track 16. Rotation of the housing within the bore of the sprocket 14 or idler wheels 28,30 causes the sprocket 14 or idler wheels 28,30 to rotate toward and away from the track 16. In all of the present track assemblies 2, 4 and 6, the track tension is maintained independent of the mounting of the track assemblies 2, 4 and 6 to the vehicle/equipment.

The idler wheels 28–32, which are shown in generalized forms, can be constructed to any desired size from any suitable material to support the intended application and loading at the track 16. The wheels 28–32 should also be constructed to alleviate any abrasion with the interior surface of the track 16. The configuration of the hub, spokes etc. of each idler wheel 28–32 can also be varied to the application. The wheels 28–32 are also constructed to be relatively intolerant to the adhesion of debris and to promote the discharge of debris from the wheels 28–32 and the track interior. The idler wheels 28–32 are aligned at the framework 26 to run in longitudinal channels between the lugs 18 at the interior surface of the track 16.

The forward and/or aft idler wheels 28 and 30 can also be secured to the framework 26 to permit an independent, resiliently biased rotation of the wheels 28, 30 relative to the framework 26. An example of such a biasing assembly is disclosed at applicant's co-pending application Ser. No. 10/348,156. In such a track assembly, the idler wheels 28 and 30 are mounted to rotate and pivot about the framework 26 subject to a continuous, resilient bias, such as established by a resilient member (e.g. spring, compressible elastomer or expansible member etc.) secured between the wheels 28 and/or 30 and/or intermediate linkage to the wheels and the framework 26. The deformation/expansion/contraction of the resilient member might also be made adjustable to permit the setting of a preferred bias.

The drive wheel, drum or sprocket 14 is presently constructed of cast aluminum, although can be constructed of other materials to accommodate the loading. Lateral teeth 20 extend between inner and outer annular bands 34 and 36 to engage the leading surfaces of the lugs 18 at the drive track 16. A multi-spoke hub 38 is secured to a drive power linkage to the vehicle/equipment that supplies drive power to the track assemblies 2, 4 and 6. The outer peripheral edges of the drive sprocket 14 are also shaped to prevent the buildup of debris between the drive sprocket 14 and track 16.

Figure 2:
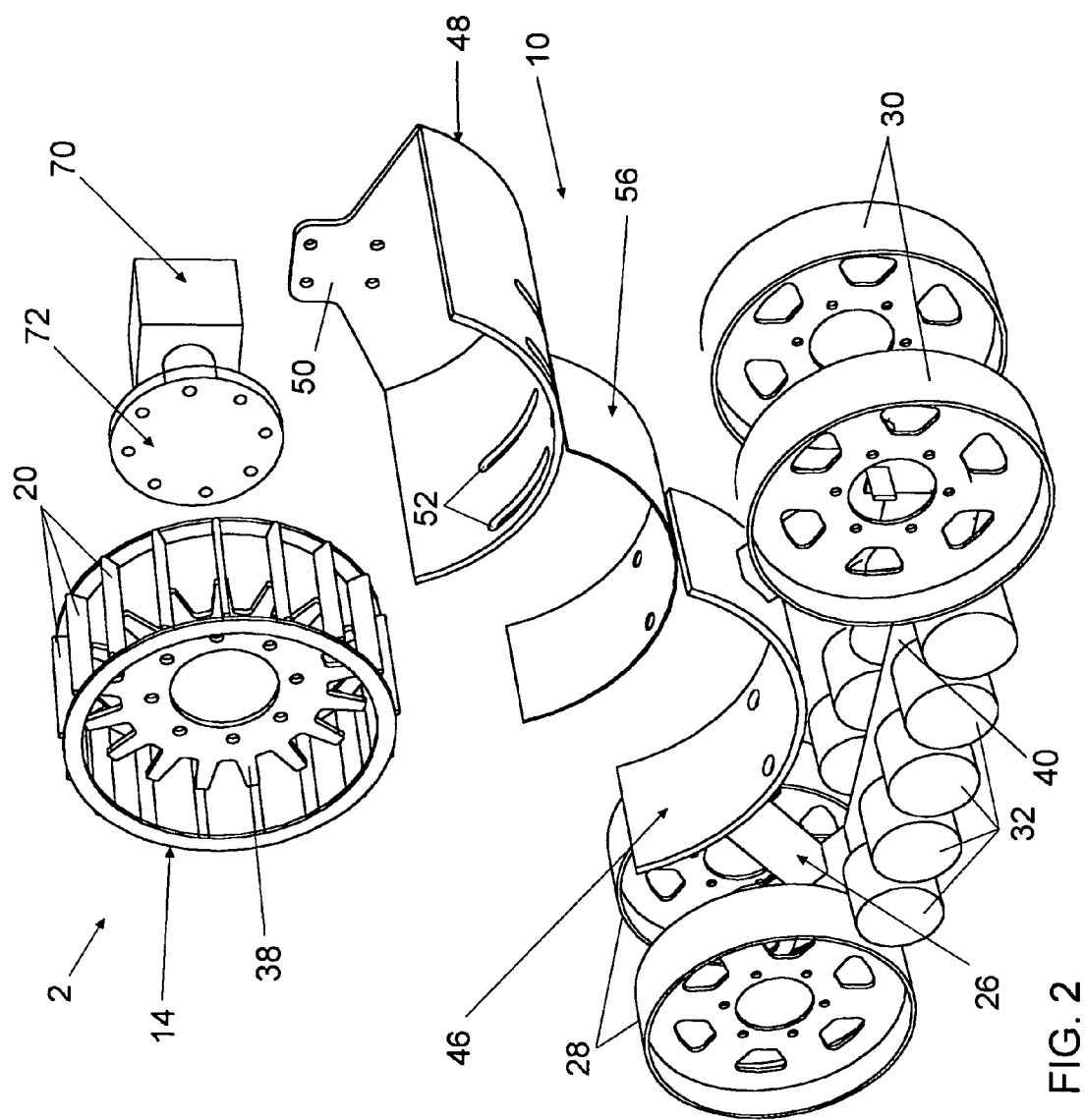
FIG. 2 is a perspective drawing of a track assembly wherein the framework and chassis bearing supports are shown in exploded assembly relative to the drive sprocket/drum and equipment power take-off.

The track assemblies 2, 4 and 6 can be secured to a variety of different drive power couplings or linkages. FIG. 2 shows a motor housing 70, such as provided at a pivoting irrigation assembly (not shown), and a sprocket 72 that mate with the hub 38 and drum 14. Drive power is directly provided from a drive shaft of the motor 70. For a self-powered vehicle, power is typically applied from an axle to a driven wheel.

Figure 3:
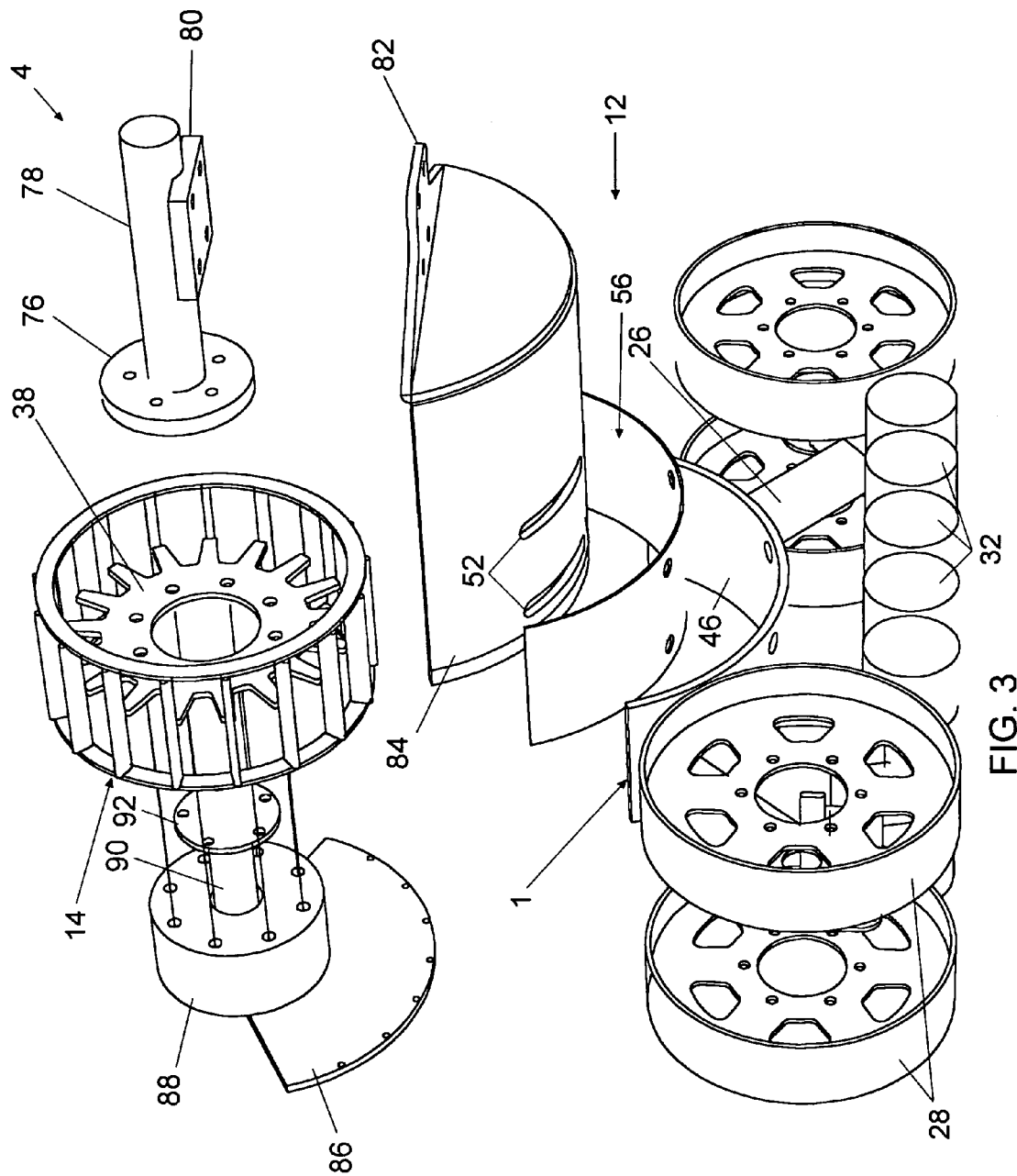
FIG. 3 is a perspective drawing of a track assembly wherein the framework and chassis bearing supports are shown in exploded assembly relative to the drive sprocket/drum and equipment power take-off head, which includes a variable drive ratio gear assembly.

FIG. 3 shows an alternative drive coupling wherein drive power is supplied from a sprocket 76 that is secured to a drive shaft (not shown) that rotates within a shaft housing 78 that extends from the equipment/vehicle. A flange 80 secured to the shaft housing 78 is configured to mount to a flange 82 of a chassis support plate 84. Separately mounted to the equipment/vehicle chassis at a mounting plate 86 is a geared transfer case 88. A drive shaft 90 and sprocket 92 extend from the case 88 and separately attach to the hub 38 to vary the rotational drive speed at the shaft 90.

Alternatively, it is to be appreciated that the flange 80 might be mounted to the plate 86. In this instance, the drive power might be supplied from a motor (not shown) or the adjacent vehicle/equipment directly through the transfer case 88 via the single shaft 90. In this instance the shaft housing 78 et al. would not be required.

Figure 4:
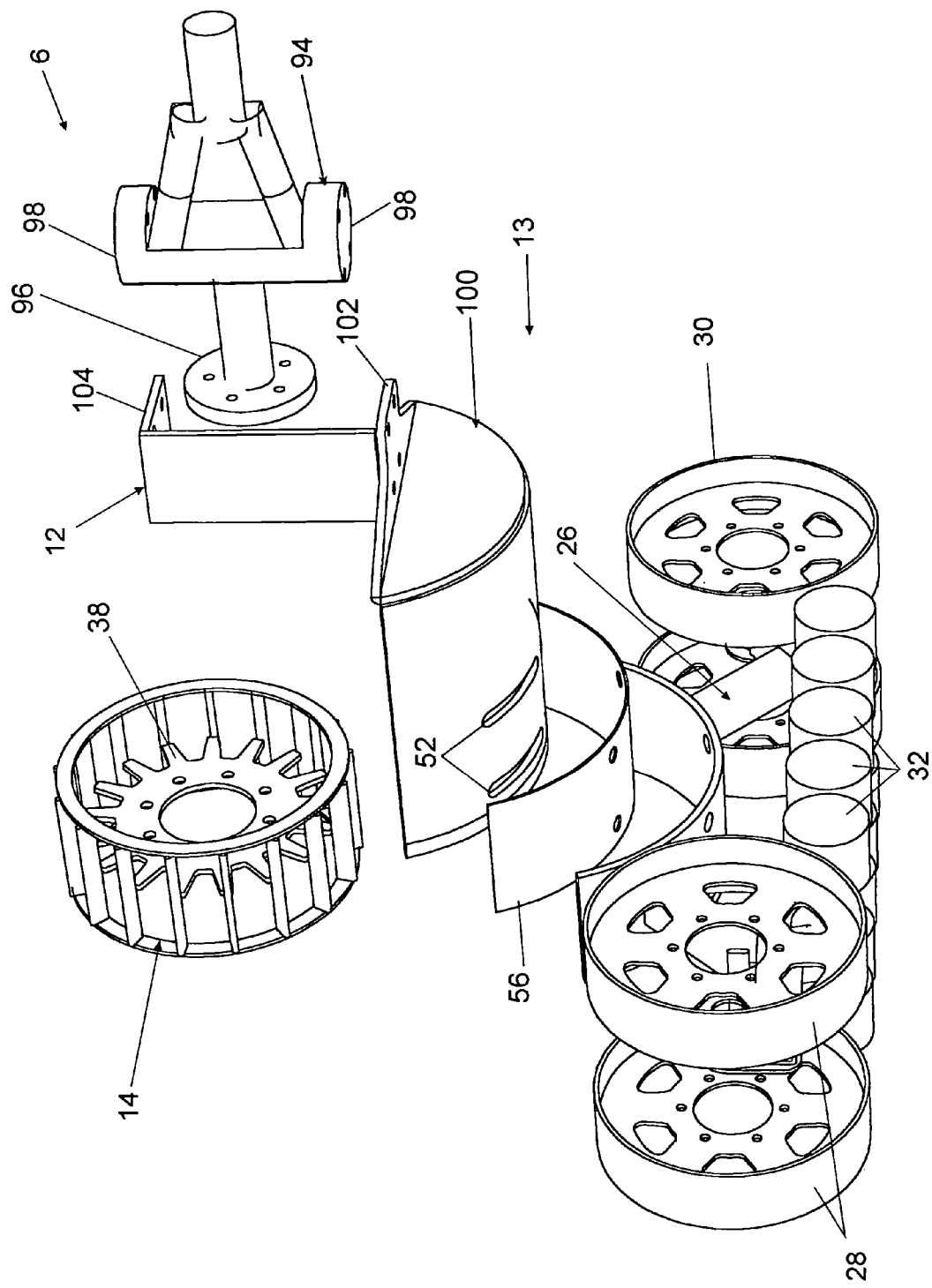
FIG. 4 is a perspective drawing of a track assembly wherein the framework and chassis bearing supports are shown in exploded assembly relative to the drive sprocket/drum and an alternative equipment power take-off.

FIG. 4 shows yet another drive coupling wherein a vehicle/equipment steering housing 94 supports a drive shaft (not shown) and sprocket 96 that mates to the hub 38 and drum 14. Flanges 98 extend from the housing 94 and couple to a vehicle/equipment chassis support plate 100. The flanges 98 particularly attach to offset flanges 102 and 104 at the chassis support plate 100. More of the details to the novel significance of the chassis support plates 48, 84 and 100 are discussed below.

The framework 26 generally includes a longitudinal section 40 that supports the idler wheels 28–32. Riser sections 42 and 44 project from the section 40 and mount to a curved or arcuate bearing support plate 46. A stationary chassis plate 48 extends from the vehicle/equipment and the plate 46 is arranged to interact with and rotate relative to the plate 48. The chassis plate 48 is typically mounted to the vehicle/equipment at a flange 50. Slots 52 are formed into the plate 48 and fasteners 54 extend between the bearing plates 46 and 48. The weight of the vehicle/equipment is thereby transferred to the bearing support plates 46 and 48 and the track framework 26, which relieves loading at the coupling to the drive sprocket 14 or other axle surfaces.

Returning attention to FIG. 2, the track framework 26 is free to rotate to and fro along the chassis support plate 48, limited by the fasteners 54 and slots 52, independent of the rotation of the drive coupling to the sprocket 14. A layer of bushing material or a bearing surface 56 is fitted between the plates 46 and 48 to facilitate relative movement. The bearing 56 can be constructed of a variety of commercially available, slippery materials, for example high density nylon, oil lite brass or UHMW plastic. Ball and/or roller bearings might also be included at/between the plates 46 and 48 to promote free relative movement and whereby the track assemblies 2, 4 and 6 can rotate relative to the vehicle/equipment chassis with terrain changes.

FIGS. 5 and 6 separately depict in diagrammatic form two generalized conditions wherein the plates 46 and 48 are biased at opposite ends relative to one another. A torsion suspension is provided to oppose and control relative movement of the track assemblies 2, 4 and 6 to the vehicle/equipment and in relation to a neutral center position. Movement of the plate 46 to either side of a central position is particularly opposed by at least one biasing member that resiliently operates to direct the member back to the neutral position.

The depicted torsion control provides for the placement of two resilient bias members 58 at or between opposing end flanges 60 and 62 at the moveable track support plate 46 and stationary chassis support plate 48. FIG. 5 depicts a neutral condition, wherein the expansion/contraction of the members 58 are balanced. FIG. 6 depicts a limit condition wherein one member 58 is fully extended and the other is fully compressed. The extended member 58 seeks to pull the moveable plate 46 back to center and the compressed member 58 seeks to push the plate 46 to the center. The bias members 58 can comprise springs, hydraulic or pneumatic cylinders, elastomers or any other material, device or assembly that provides a resilient, push-pull operation relative to the chassis and track support plates. It is to be appreciated also that the positioning of the bias members can be varied relative to the chassis support plates 48, 84 and 100 relative to the track support plate 46.

While the invention has been described with respect to a number of preferred constructions and considered improvements or alternatives thereto, still other constructions may be suggested to those skilled in the art. It is also to be appreciated that selected ones of the foregoing features can be used singularly or can be arranged in different combinations to provide a variety of other improved track assemblies. The foregoing description should therefore be construed to include all those embodiments within the spirit and scope of the following claims.

What is claimed is:

1. A track assembly for conveying a mobile device comprising:
    a) a framework including a plurality of idler wheels and a first plate secured to said framework
    b) a drive power source coupled to said framework;
    c) an endless track trained around said plurality of idler wheels; and
    d) a second plate mounted to a chassis of said device and aligned to cooperate with said first plate such that said first and second plates move on one another, whereby said framework supports the weight of said device as said track assembly rotates relative to said device.

2. A track assembly as set forth in claim 1 including bearing means fitted between said first and second plates to facilitate relative motion.

3. A track assembly as set forth in claim 1 including a slippery bearing material fitted between said first and second plates.

4. A track assembly as set forth in claim 1 including a plurality of bearings fitted between said first and second plates.

5. A track assembly as set forth in claim 1 wherein said first and second plates exhibit arcuate mating surfaces.

6. A track assembly as set forth in claim 1 wherein said first and second plates are resiliently biased relative to one another for reciprocating motion between first and second limit positions.

7. A track assembly as set forth in claim 6 wherein said first and second plates are resiliently biased to a neutral position between said first and second limit positions.

8. A track assembly as set forth in claim 6 wherein a compressible member is fitted between said first and second plates.

9. A track assembly as set forth in claim 1 wherein one of said first and second plates includes a slot and wherein a stop member is arranged relative to said slot to limit rotation of said first and second plates relative to one another.

10. A track assembly for conveying a mobile device comprising:

a) a framework including a plurality of rotatively mounted idler wheels, and a first plate secured to said framework;

b) a drive power source coupled to said framework;

c) an endless track trained around said framework; and d) a second plate mounted to a chassis of said device and aligned to cooperate with said first plate such that said first and second plates move on one another, whereby said framework supports the weight of said device as said track rotates relative to said device.

11. A track assembly as set forth in claim 10 wherein said first and second plates are resiliently biased relative to one another for reciprocating motion between first and second limit positions.

12. A track assembly as set forth in claim 10 including a slippery bearing material fitted between said first and second plates.

13. A track assembly as set forth in claim 10 wherein said first and second plates exhibit arcuate mating surfaces.

14. A track assembly for conveying a mobile device comprising:

a) a framework including a plurality of rotatively mounted idler wheels, and a first plate secured to said framework;

b) an endless track trained around said plurality of idler wheels; and c) a second plate mounted to a chassis of said device and aligned to cooperate with said first plate such that said first and second plates move on one another, whereby said framework supports the weight of said device as said track rotates relative to said device.

15. A track assembly as set forth in claim 14 wherein said first and second plates are biased relative to one another for reciprocating motion between first and second limit positions.

16. A track assembly as set forth in claim 14 including a stop member arranged to limit rotation of said first and second plates relative to one another.

17. A track assembly as set forth in claim 14 including bearing means fitted between said first and second plates to facilitate relative motion.

18. A track assembly as set forth in claim 14 including a slippery bearing material fitted between said first and second plates.

19. A track assembly as set forth in claim 14 wherein said first and second plates exhibit arcuate mating surfaces.

20. A track assembly as set forth in claim 14 including a drive sprocket coupled to said framework to rotate said track.

21. A track assembly for conveying a mobile device comprising:

a) a framework including a plurality of rotatively mounted idler wheels, and a first planar member secured to said framework;

b) an endless track trained around said plurality of idler wheels; and c) a second planar member mounted to a chassis of said device and aligned to cooperate with said first planar member such that said first and second planar members move on one another, whereby said framework supports the weight of said device as said track rotates relative to said device.

* * * * *